(12) United States Patent
Pope et al.

(10) Patent No.: US 11,847,108 B2
(45) Date of Patent: Dec. 19, 2023

(54) SYSTEM AND METHOD FOR CAPTURING DATA TO PROVIDE TO A DATA ANALYSER

(71) Applicant: XILINX, INC., San Jose, CA (US)

(72) Inventors: Steven L. Pope, Cambridge (GB); David J. Riddoch, Huntingdon (GB); Matthew Knight, Irvine, CA (US)

(73) Assignee: XILINX, INC., San Jose, CA (US)

( * ) Notice: Subject to any disclaimer, the term of this patent is extended or adjusted under 35 U.S.C. 154(b) by 213 days.

(21) Appl. No.: 16/596,581

(22) Filed: Oct. 8, 2019

(65) Prior Publication Data
US 2020/0042509 A1 Feb. 6, 2020

Related U.S. Application Data

(60) Division of application No. 14/752,472, filed on Jun. 26, 2015, now Pat. No. 10,733,167, which is a
(Continued)

(51) Int. Cl.
G06F 16/22 (2019.01)
G06F 16/23 (2019.01)
H04L 43/04 (2022.01)
H04L 43/12 (2022.01)
H04L 43/028 (2022.01)

(52) U.S. Cl.
CPC ...... G06F 16/2272 (2019.01); G06F 16/2322 (2019.01); H04L 43/028 (2013.01); H04L 43/04 (2013.01); H04L 43/12 (2013.01)

(58) Field of Classification Search
CPC ............. G06F 16/2272; G06F 16/2322; H04L 43/028; H04L 43/04; H04L 43/12
See application file for complete search history.

(56) References Cited

U.S. PATENT DOCUMENTS 6,519,714 B1   2/2003  Sweet et al.
6,836,800 B1  12/2004  Sweet et al.
(Continued)

FOREIGN PATENT DOCUMENTS

CN    101197742 B  *  4/2010
EP    2556632 A1      2/2013
(Continued)

OTHER PUBLICATIONS

EP 16171767.3—Extended European Search Report dated Oct. 21, 2016, 7 pages.
(Continued)

Primary Examiner — Mark D Featherstone
Assistant Examiner — Faezeh Forouharnejad
(74) Attorney, Agent, or Firm — Haynes Beffel & Wolfeld LLP; Andrew L. Dunlap

(57) ABSTRACT

A system has data capture devices collecting data from different points in a network. The captured data is written to a data store and is directed to an output. The data from the different data capture devices can be delivered to a data analytics device. As long as the data analytics device is able to keep pace with the data that is directed to the output, that data is used by the analytics device. If the analytics device is not able to keep pace, the data written to the data store is retrieved and is used until the analytics device has caught up.

15 Claims, 5 Drawing Sheets

Related U.S. Application Data continuation-in-part of application No. 14/730,094, filed on Jun. 3, 2015, now Pat. No. 10,691,661.

(56) References Cited

U.S. PATENT DOCUMENTS

| | | | |
|---|---|---|---|
| 7,031,884 | B1 | 4/2006 | Radulovic et al. |
| 7,093,037 | B2 | 8/2006 | Duckman |
| 7,133,808 | B2 | 11/2006 | Radulovic et al. |
| 7,181,675 | B2 | 2/2007 | Mantog |
| 7,299,277 | B1 | 11/2007 | Moran et al. |
| 7,315,542 | B2 | 1/2008 | Gil et al. |
| 7,415,390 | B2 | 8/2008 | Radulovic et al. |
| 7,587,762 | B2 | 9/2009 | Singhal et al. |
| 7,613,714 | B2 | 11/2009 | Hiller et al. |
| 7,711,751 | B2 | 5/2010 | Kelley et al. |
| 7,764,626 | B2 | 7/2010 | Wilken |
| 7,953,876 | B1 | 5/2011 | Roman et al. |
| 8,125,908 | B2 | 2/2012 | Rothstein et al. |
| 8,180,943 | B1* | 5/2012 | Priem ............ G06F 9/4812 |
| | | | 710/262 |
| 8,185,651 | B2 | 5/2012 | Moran et al. |
| 8,311,059 | B2 | 11/2012 | Williams |
| 8,447,802 | B2 | 5/2013 | Landrum et al. |
| 8,494,000 | B1 | 7/2013 | Nadkarni et al. |
| 8,572,609 | B2 | 10/2013 | Wu |
| 8,582,454 | B2 | 11/2013 | Singhal et al. |
| 8,626,912 | B1 | 1/2014 | Rothstein et al. |
| 8,634,437 | B2 | 1/2014 | Wu |
| 8,635,387 | B2 | 1/2014 | Liu et al. |
| 8,848,744 | B1 | 9/2014 | Rothstein et al. |
| 8,867,343 | B2 | 10/2014 | Rothstein et al. |
| 8,892,733 | B2 | 11/2014 | Hirata et al. |
| 8,898,339 | B2 | 11/2014 | Dries et al. |
| 8,914,726 | B2 | 12/2014 | Mollitor et al. |
| 8,929,378 | B2 | 1/2015 | Christophersen |
| 9,025,486 | B1 | 5/2015 | Murphy et al. |
| 9,065,744 | B2 | 6/2015 | Harrison |
| 9,723,056 | B1* | 8/2017 | Kuo ............ H04L 67/2828 |
| 9,877,292 | B2* | 1/2018 | Barrett ............ H04L 67/125 |
| 2003/0236819 | A1 | 12/2003 | Greubel |
| 2004/0133733 | A1 | 7/2004 | Bean et al. |
| 2005/0144165 | A1 | 6/2005 | Hafizullah et al. |
| 2007/0171834 | A1* | 7/2007 | Sathyanarayana ...... H04L 43/50 |
| | | | 370/241 |
| 2007/0248029 | A1* | 10/2007 | Merkey ............ H04L 43/02 |
| | | | 370/255 |
| 2009/0285094 | A1 | 11/2009 | Straub et al. |
| 2009/0290848 | A1 | 11/2009 | Brown |
| 2009/0313252 | A1 | 12/2009 | Gupta et al. |
| 2010/0074124 | A1 | 3/2010 | Peterman et al. |
| 2011/0131324 | A1 | 6/2011 | Chaturvedi et al. |
| 2012/0233000 | A1 | 9/2012 | Fisher et al. |
| 2012/0281703 | A1 | 11/2012 | Agerholm et al. |
| 2013/0212263 | A1* | 8/2013 | Breslin ............ H04L 43/04 |
| | | | 709/224 |
| 2013/0254324 | A1 | 9/2013 | Kramnik et al. |
| 2013/0311609 | A1 | 11/2013 | Kragh et al. |
| 2013/0329751 | A1* | 12/2013 | Zhao ............ H04L 65/1066 |
| | | | 370/468 |
| 2014/0040464 | A1 | 2/2014 | Singhal et al. |
| 2014/0280386 | A1 | 9/2014 | Mokos et al. |
| 2014/0355613 | A1 | 12/2014 | Pope et al. |
| 2016/0357793 | A1 | 12/2016 | Pope et al. |
| 2016/0357796 | A1 | 12/2016 | Pope et al. |

FOREIGN PATENT DOCUMENTS

| | | |
|---|---|---|
| EP | 2809033 A1 | 12/2014 |
| WO | 2005024557 A2 | 3/2005 |
| WO | 2011126603 A1 | 10/2011 |
| WO | 2012163395 A1 | 12/2012 |

OTHER PUBLICATIONS

EP 16171769.9—Partial European Search Report dated Oct. 17, 2016, 7 pages.
U.S. Appl. No. 14/730,094—Office Action dated Sep. 7, 2017, 26 pages.
Steve Pope "Packet Capture in a Network," Date of publication: Mar. 12, 2014, Bulletin 2014/49, EP 2809033.
Peter Korger "An Apparatus and a Method of Parallel Receipt, Forwarding and Time Stamping Datapackets Using Synchronized Clocks," International Publication Date: WO 2012/163395 A1, Dec. 6, 2012.
U.S. Appl. No. 14/752,472—Office Action dated Sep. 19, 2017, 38 pages.
U.S. Appl. No. 14/752,472—Response to Office Action dated Sep. 19, 2017 filed Dec. 13, 2017, 13 pages.
U.S. Appl. No. 14/752,472—Final Office Action dated Apr. 16, 2018, 38 pages.
U.S. Appl. No. 14/730,094—Response to Office Action dated Sep. 7, 2017 filed Mar. 7, 2018, 23 pages.
U.S. Appl. No. 14/730,094—Final Office Action dated Jul. 10, 2018, 19 pages.
U.S. Appl. No. 14/730,094—Response to Final Office Action dated Jul. 10, 2018 filed Sep. 19, 2018, 11 pages.
U.S. Appl. No. 14/752,472—Response to Final Office Action dated Apr. 16, 2018 filed Jul. 16, 2018, 15 pages.
U.S. Appl. No. 14/752,472—Supplemental Response to Final Office Action dated Apr. 16, 2018 filed Jul. 19, 2018, 6 pages.
U.S. Appl. No. 14/730,094—Advisory Action dated dated Oct. 15, 2018, 4 pages.
U.S. Appl. No. 14/752,472—Office Action dated Nov. 19, 2018, 41 pages.
U.S. Appl. No. 14/730,094—Office Action dated Jan. 8, 2019, 22 pages.
EP 16171769.9—Extended European Search Reoprt dated Jan. 24, 2017, 5 pages.
EP 16171769.9—Examination Report dated Mar. 8, 2019, 8 pages.
U.S. Appl. No. 14/730,094—Response to Office Action dated Jan. 8, 2019 filed May 8, 2019, 13 pages.
U.S. Appl. No. 14/752,472—Response to Office Action dated Nov. 19, 2018 filed Mar. 13, 2019, 17 pages.
U.S. Appl. No. 14/752,472—Notice of Allowance dated Jul. 8, 2019, 17 pages.
U.S. Appl. No. 14/730,094—Office Action dated Aug. 21, 2019, 24 pages.

* cited by examiner

US 11,847,108 B2

SYSTEM AND METHOD FOR CAPTURING DATA TO PROVIDE TO A DATA ANALYSER

CROSS REFERENCE AND RELATED APPLICATION

This application is a divisional of U.S. application Ser. No. 14/752,472, filed Jun. 26, 2015, entitled "SYSTEM AND METHOD FOR CAPTURING DATA TO PROVIDE TO A DATA ANALYSER," by Steven L. Pope, David J. Riddoch, and Matthew Knight, which is a continuation-in-part of U.S. application Ser. No. 14/730,094 entitled "SYSTEM AND METHOD FOR MANAGING THE STORING OF DATA" by Steven L. Pope and David J. Riddoch filed Jun. 3, 2015, which applications are incorporated herein by reference in their entirety.

BACKGROUND OF THE INVENTION

Field

Some embodiments relate to a system and method for capturing data at different points and providing said captured data from the different points to a data using application.

Background

Data networks may be arranged such that the monitoring and/or capturing of data flows is required. The amount of data which needs to be captured may be relatively large. Queries may also need to be run with respected to the captured data.

SUMMARY

According to an aspect, there is provided a system comprising: a plurality of data capture devices, each of said data capture devices being configured to cause said data to be stored in a data store, wherein each data capture device is configured to output data either from the data store or substantially in real time; and a data using application configured to receive data from said plurality of devices, said data using device configured to receive the data output substantially in real time or data from said data store from said plurality of data capture devices.

The data using application may be configured to receive data from said data store if said data using application cannot process said data output substantially in real time.

The data captured by said data capture devices may captured in a first format and output in a different format with time information. This different format may be so as to be in accord with the communication protocol between the capture devices and the device receiving the output data. The different format may be an encapsulated format. Alternatively or additionally, the different format may be a format used by the data using application The said data capture device may be configured to include time stamp information in said data which is output. The time stamp information may comprise metadata added to said data.

The system may comprise at least one processor configured to process said output data such that said data is substantially in said first format The at least one processor may be configured to control a rate of output of said data to said data using application.

The processor may be configured to control the rate of output of data to said application such that said rate does not exceed a maximum output rate.

The at least one processor configured to process said output data may be provided in a data using device supporting said data using application. The data using device may be an analytics device.

The at least one processor configured to process said output data may be provided in a data injecting device.

The system may comprise at least one buffer configured to store said output data.

The buffer may be configured to receive said data output substantially in real time until said buffer is substantially filled and subsequently receive data retrieved from said data store.

The buffer may be configured to receive said data output substantially in real time when said data from said data store has caught up with said data output substantially in real time.

The buffer may be provided in one of a data using device supporting said application and a data injecting device provided between a data using device supporting said application and said plurality of data capture devices.

According to another aspect, there is provided a data injecting arrangement comprising: an input configured to receive from at least data capture device, data captured by said device, said data being captured in a first format and transmitted in a different format with time information; at least one buffer configured to store data; at least one processor configured to process said received data such that said data is substantially in said first format; and an output configured to output said received data substantially in said first format to an application which uses said data.

The at least one processor may be configured to control a rate of output of said data to said application.

The processor may be configured to control the rate of output of data to said application such that said rate does not exceed a maximum output rate.

The input may be configured to receive one of substantially real time data and data retrieved from a data store.

The input may be configured to receive said substantially real time data until said buffer is substantially filled and subsequently receive data retrieved from said data store.

The input may be configured to receive said substantially real time data again when said retrieval of data from said data store has caught up with said substantially real time data.

The processor may be configured to add said time information into said data substantially in said first format.

The different format may be an encapsulated format.

According to another aspect, there is provided a system comprising a first device and at least one data capture device, said at least one data capture device comprising: an input configured to capture data in a first format; a processor configured to process said data to have a different format and to include time stamp information; a writer configured to write said data to a data store; and an output configured to output said data in said different format, and said first device comprising: an input configured to receive from at least one data capture device, said data in said different format with time information; at least one buffer configured to store data; at least one processor configured to process said received data such that said data is substantially in said first format; and an output configured to output said received data substantially in said first format to an application which uses said data.

According to an aspect, there is provided method comprising: capturing data at a plurality of different points, storing said captured data; directing at least some of the captured data to respective outputs; outputting stored data or data directed to said respective outputs; receiving from a plurality of different points the data directed to said respective output or said stored data; and using said data in a data using application.

The method may comprise receiving stored data from said data store if said data using application cannot keep pace with data directed to the respective outputs. The data capture may be is captured in a first format and output in a different format with time information The different format may be an encapsulated format.

The method may comprise including time stamp information in said data which is output.

The method may comprise processing said output data such that said data is substantially in said first format The method may comprise controlling a rate of output of said data to said application The method may comprise controlling the rate of output of data to said application such that said rate does not exceed a maximum output rate.

The method may comprise receiving in a buffer said data directed to the respective outputs until said buffer is substantially filled and subsequently receiving said stored data.

The method may comprise receiving in the buffer, said data directed to said respective output when said stored data has caught up with said data directed to said output.

The computer program product may be able to cause any one or more of the previous method features to be performed.

It should be appreciated that each of the above features may be used in combination with any one or more other features.

BRIEF DESCRIPTION OF DRAWINGS

Some embodiments will now be described by way of example only with reference to the accompanying Figures in which.

DETAILED DESCRIPTION OF EMBODIMENTS

Figure 1:
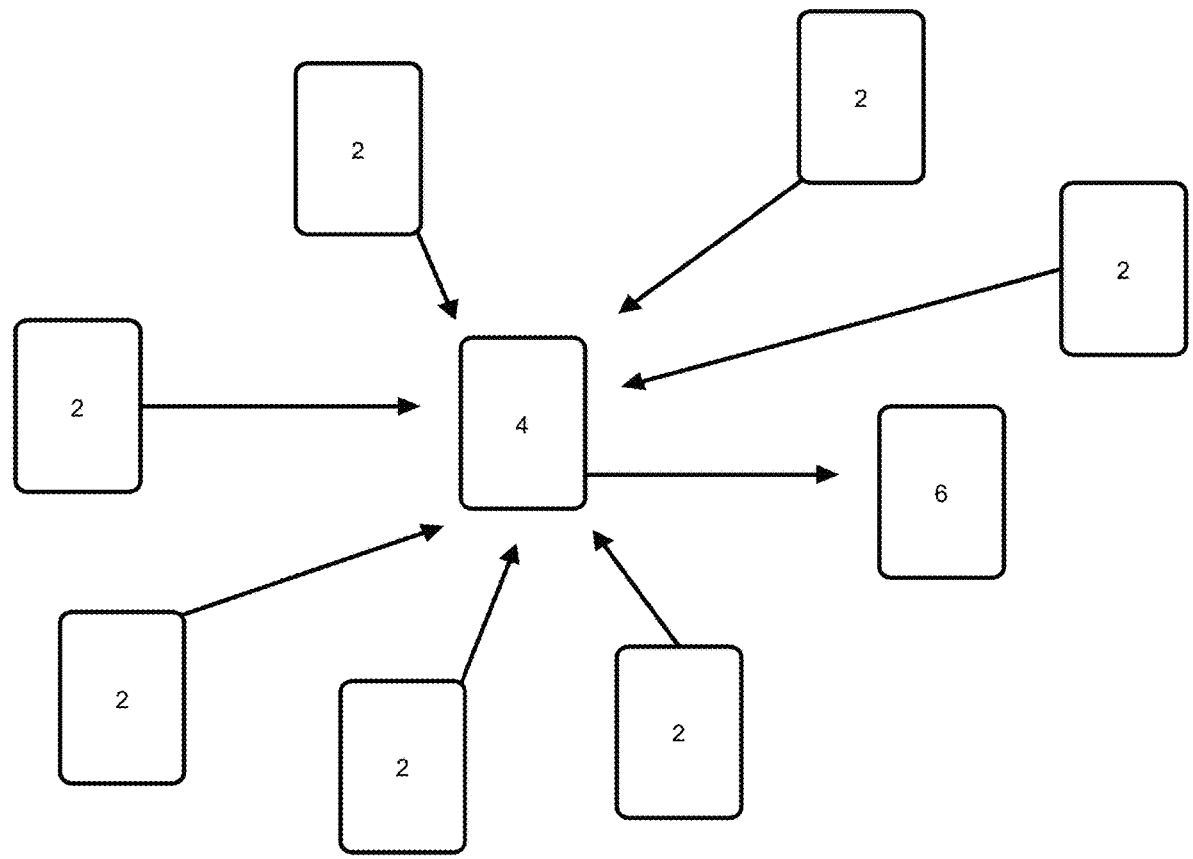
FIG. 1 shows a schematic view of an embodiment.

Some embodiments may be provided in the context of a data network where monitoring and/or capturing of data flows is required and where analysis is carried out on the data flows.

The analysis of the data flows may be performed for network performance purposes, to determine a threat, for network management purposes, for statistics and/or for any other suitable reason. In some situations, it may be required that one or more specific flows need to be captured. For example one or more flows identified by a particular set of IP addresses may be required to be captured.

A number of specialized analytic devices are known providing analysis of various types of data. By way of example only, such devices may provide financial, application, security or similar analysis. These devices are typically provided with a relatively small number of interfaces designed to capture, parse and analyze raw network frames.

In a distributed network, such devices may be deployed using a direct capture deployment or a network connected deployment.

With direct capture, an analytics device is deployed wherever the network links containing the data are physically located and "plumbed in" to receive, optionally timestamped, frames to be processed. In cases with many network links requiring analytics, the direct capture model may be inefficient as the number of analytics devices deployed is a function of the number of links of interest as opposed to the processing capacity of the analytics devices. As these analytics device may be complex and/or have very specific applications, it may be expensive to use these devices in the direct capture model. With direct capture, the analytics devices must be designed to guarantee capture under all network conditions even though off-line analysis only may be required. This can place burdensome requirements on the hardware required With network connected deployment, network devices such as aggregation switches can be used to deliver multiple links and deliver (optionally time-stamped) packets to the analytics devices. The network connected model may allow for more efficient scaling. However two limiting factors may need to be taken into account. The first is that these network aggregation switches will be aggregating traffic streams from multiple links at the rate that packets come in. These aggregated traffic streams are then delivered to the analytics device. However the capture, analysis and processing capacity of the analytics device may well be exceeded, especially when traffic levels are high e.g. financial market data at the time of market opening. The second factor with any aggregation of network interfaces is that there may be the potential for the aggregate ingress packet rate to exceed the available egress packet rate. Network devices can buffer frames, however the devices used currently typically only have in the order of 10 MB of buffering available. For example, 10 MB represents ~1 ms of line-rate 10 GbE traffic. It would therefore only require 10 input ports being aggregated to a single output port to receive more than ~100 µs of traffic concurrently for loss to occur with frames being dropped and thus never be received by the analytics device. Once these frames have been dropped, they are lost forever from the analytics device's perspective leaving the analytics device to work on an incomplete data set.

Some embodiments may address or at least mitigate these problems.

Reference is made to FIG. 1 which schematically shows an architecture of some embodiments. In the arrangement shown in FIG. 1, there are a number of data capture devices 2. Each of those data capture devices will capture some or all the data which is kept it is capable of capturing. The data which is captured may be written to disk and/or sent to a packet injecting device 4. The packet injecting device 4 has a TCP (Transmission control protocol) or other protocol connection which each of the data capture devices. Accordingly, data is sent from a data capture device in an encapsulated form in accordance with the TCP protocol to the packet injecting device 4.

The packet streams may be tunneled over TCP to the remote consuming application on the analytics device. The consuming applications attach to the tunneled streams via the packet injecting device which terminates the streams locally.

It should be appreciated that different protocols may be used in other embodiments for the communication between each data capture device 2 and the packet injecting device 4.

The packet injecting device 4 is configured to provide the required data to an analytics device 6. The packet injecting device 4 may process the data before providing the data to the analytics device 6. In particular, the packet injecting device 4 may process the data so that the data is in a similar format to the format in which the data was captured by the respective data capture device 2, optionally with the addition of the time stamp information.

It should be appreciated that the other devices may be used instead of an analytics device. In particular, any other suitable device requiring access to the data may instead be used. Some embodiment may be provide where processing is required on data captured at two or more different points. By way of example only, an intrusion detection sensor device may be provided instead of the analytics device.

In some embodiments, the devices referenced 4 and 6 may be separate devices, contained in the same device, implemented as virtual devices, virtual appliances, virtual machines, or containers on the same or different physical devices.

Figure 2:
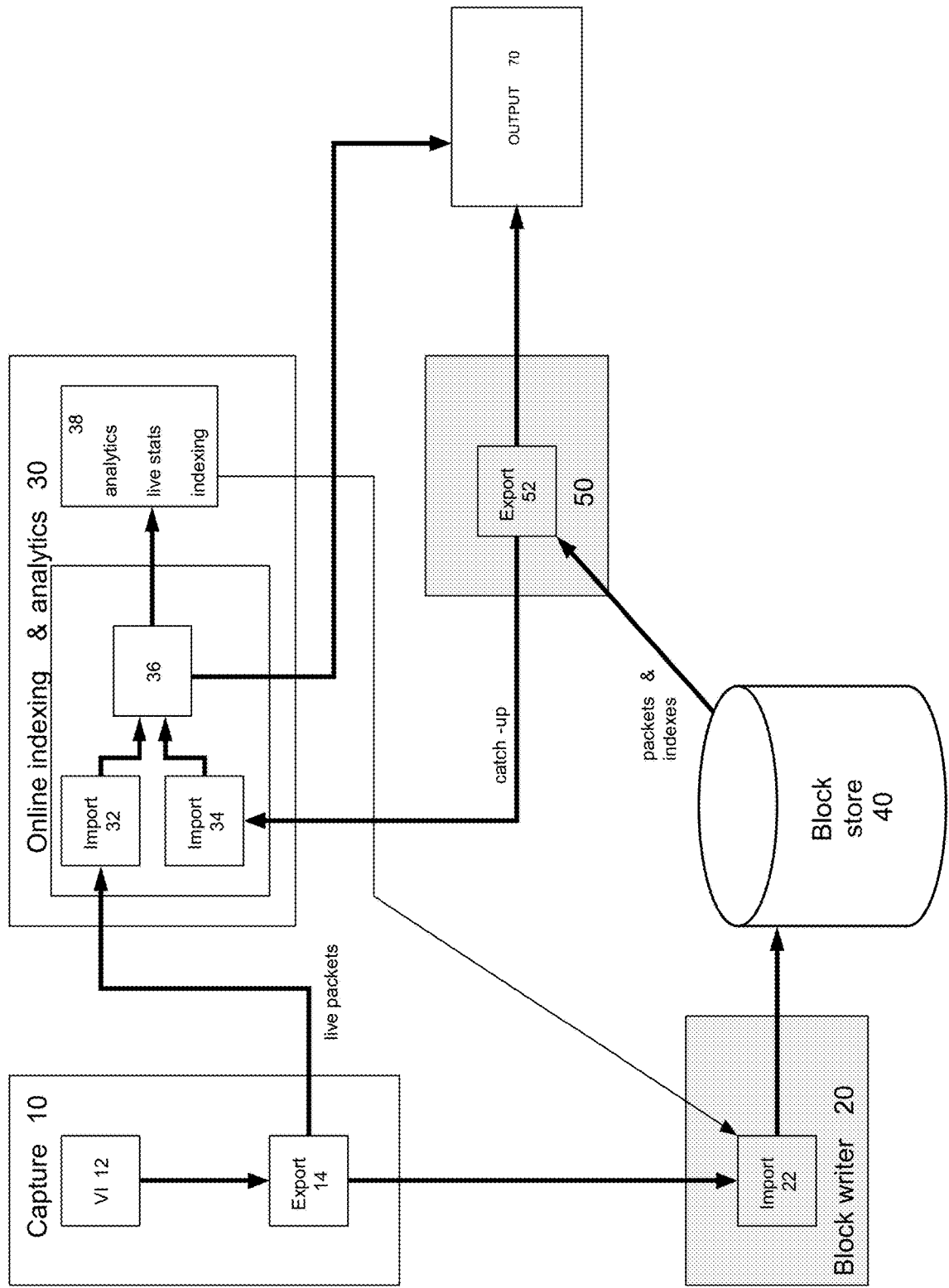
FIG. 2 shows in more detail a capture device of FIG. 1.
Figure 3:
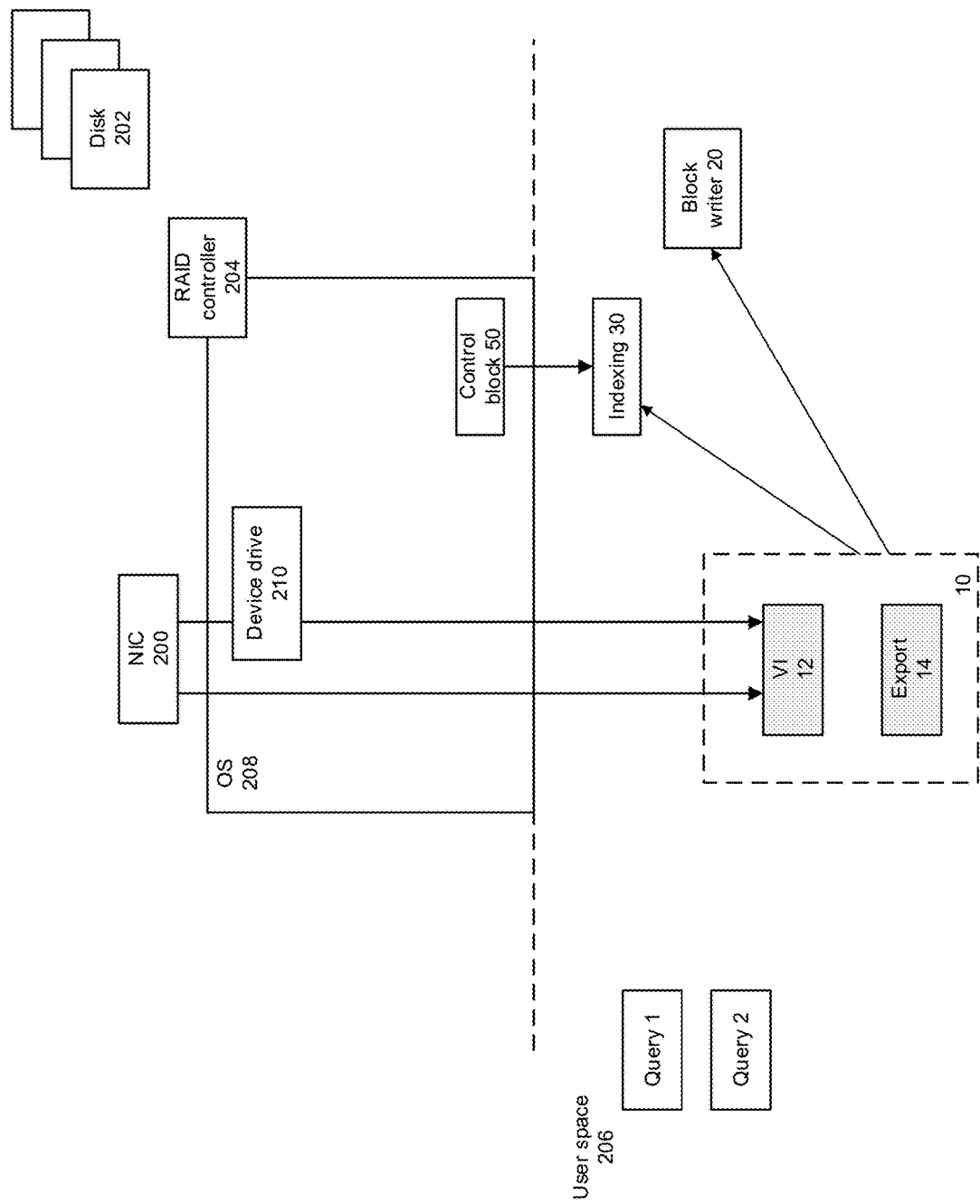
FIG. 3 shows in more detail an architecture providing the capture device of FIG. 1.

Reference is now made to FIGS. 2 and 3 which show a data capture device in more detail.

Referring first to FIG. 2, the data capture device has a capture block 10 configured to capture a data flow. The data flow may comprise data packets or data in any other suitable format. In particular, the capture block 10 has a virtual interface VI 12 or the like which receives the data flow. The data flow from the VI 12 is provided to an export block 14 which passes the live packets to an indexing block 30 which indexes the data flow. In some embodiments, the capture block may be provided by a network interface device or card.

The export block 14 also provides the packets to a block writer 20 and in particular to an import block 22 of the block writer 20. The block writer 20 also receives indexing data from the indexing block 30. The block writer will write the data flow and the indexes to a block store 40. In some embodiments a time stamp is included in the data written to the data store. In some embodiments, the indexing data and the associated data are stored on a common disk. In other embodiments, the indexing data and associated data are stored on separate disk devices. In this case, separate block writers or separate block writer instances may be provided for the indexing data and the associated data.

In some embodiments, the block writer is arranged to serialize the captured data to provide a single output thread. Thus, a single writer thread per block store device may be provided. The block writer ensures that the writes to the block store are sequential. For example the data flow which is received by the block writer may comprise a plurality of threads. The different threads may come from the same capture block or different capture blocks. Embodiments may be such the non sequential access to the block store is avoided. Sequential access increases the rate at which it is possible to write to disk. This is ensured by multiplexing by the import block of the input streams to provide the single serial output to the block store.

Some of the data flow may still require indexing if the indexing block is unable to index in real time all the packets of the data flow.

Data flows, including the time stamps, and the associated indexes (if available) can be read out by a control block 50. The control block 50 has an export block 52 which can export from the control block. The control block is able to provide the data flows and any available indexes to the indexing block 30 and/or to the packet injector 4 via an output block 70.

The control block is configured to monitor buffer utilization in the capture path (that is buffers in the capture block), and if the buffer utilization gets too high, the control block throttles the rate of reading from the block store 40 so that the block writer 20 has enough bandwidth to keep up with the capture rate.

The control block may be the only block which is able to read data from the block store. The control block may be configured to prioritize writing to the block store over reading. This is done by throttling the rate at which the control block submits reads to the block store. The capture path exports information about buffer utilisation that the control block imports. If buffer utilisation is getting high, then the block writer is not In some embodiments, the received packets from the capture block 10 are output to the indexing block 30. The indexing block 30 may provide online indexing and analytics. In some embodiments, the indexing block may provide real time indexing. In some embodiments, the live packets are captured by import block 32 of the indexing block and processed by process block 36. If the indexing block has indexed a packet in real time, indexing information is sent to the block writer which writes the packet and the indexing information into the block store. The indexing information may provide summary information. If the indexing block is not able to index on a live basis, the catch up packets are read out by the control block from the block store into memory so as to be accessible to the indexing block. The indexing block will provide the indexing information for the catch up packets to the block writer which writes the indexing information into the block store. The process block 36 may allow different data sources (for example the catch up packets and the live packets) to be combined into one stream or to be individually selected, as required.

In some embodiments, the live packets and optionally at least some of the indexing information may be output to the output block. The output block 70 is configured to encapsulate the received data so as to be in compliance with the relevant protocol, for example TCP, and also to include a time stamp. The received data may be in any suitable format, for example the PCAP (packet capture) format. The output block 70 is network-connected to the packet-injector and is able to forward on the captured data and meta data (including time-stamps). This block may format the data in the most suitable format for the analytics device. For example in the most efficient format for final storage, the native format used by the analytics device, compressed, and/or or encrypted. In some embodiments, at least some of this formatting may alternatively or additionally be done by the packet injecting device.

The data which is output to the packet injecting device which is not retrieved from the block store is considered to be substantially in real time or to be data in motion. In particular, this data in motion is streaming through memory or the network from the data collection device to the packet injector. Any data in motion for the purposes of this document can be considered "real time" although in practice the data which is streaming through to the analyzer device will be subject to small delays caused by the passage of that data through various components. The term real time in the context of this document refers to data in motion and is distinguished from the data which is written to the block store and subsequently retrieved from the block store.

In some embodiments, a real time query may be carried by the online indexing and analytics block on the received data. In some embodiments, the real time query may fall behind as the block is not able to keep up with the input data.

In this situation, the control block is configured to read out the catch up packets from the block store into shared memory The online indexing and analytics block is then able to use the catch up packets to bring the "real time" query back up to date.

In some embodiments an API may be provided in the output block 70. The packet injecting device may be provided with an interface to the API.

In some embodiments, data may be passed between the data capture block and the packet injecting device using sockets.

The function of the indexing block will now be described in more detail. In some embodiments, every incoming frame or packet should match a flow template. Therefore either a matching flow template exists or a new one needs to be created dynamically. In some embodiments, information is provided to locate the persisted frame and is associated with the flow meta-data.

Each packet is parsed and set of header fields extracted. These fields, together with other meta-data are combined to form a flow key. The other meta-data may comprise one or more of timestamp, packet ID, error indication(s) and the like. A flow consists of the set of packets that match a particular flow key. For each unique flow key a flow record is maintained that consists of the flow key, summary data for packets in the corresponding flow and location data for packets in the flow.

The summary data may comprise one or more of the number of packets and bytes in the flow.

The location data may comprise a list of packet indicators, each giving the location of a packet in the block store that is a member of the flow.

The location data may include comprise a list of block indicators, each giving the location of a block in the block store, each block containing at least one packet that is a member of the flow.

The location data may comprise packet indicators giving the location of the first packet in the flow following a temporal boundary.

Various other representations of location data are possible, in other embodiments.

Reference is made to FIG. 3 which shows an architecture in which the arrangement of FIG. 2 may be provided. The system comprises a redundant array of independent disks RAID 202 which provide the block store 40. The RAID 202 are controlled by a RAID controller 204. The RAID controller 204 may be at least partially provided in the OS (operating system) 208. One or more network interface devices (e.g. NICs) 200 may be provided which provides an interface between a network (not shown) and the OS 208. The NIC may be supported by a device driver 210 in the OS. The data which is received by the NIC may be passed to the capture block 10 which in some embodiments is located in the user space. The data thus goes from the NIC to host memory and from there to the block writer and indexing block. The indexing block 30 and block writer are also provided in the user space. In some embodiments, the control block 50 is provided in the operating system.

In some embodiments, a data flow may be provided by one or more packets. In some embodiments, a data flow may be provided by one or more frames. In some embodiments, a frame may comprise one or more packets. It should be appreciated in other embodiments, any other suitable unit or block of data may comprise a data flow. In some situations, it may be desirable to capture all data flows, which are then archived and potentially retrieved at a later date.

It should be appreciated that in some embodiments, one or more packets may be part of two or more flows. In that scenario, a packet may have one index or more than one index. An index may be provided for each flow which the packet is part of.

Some embodiments may capture all data whereas other embodiments may only capture some of the data flows.

Figure 4:
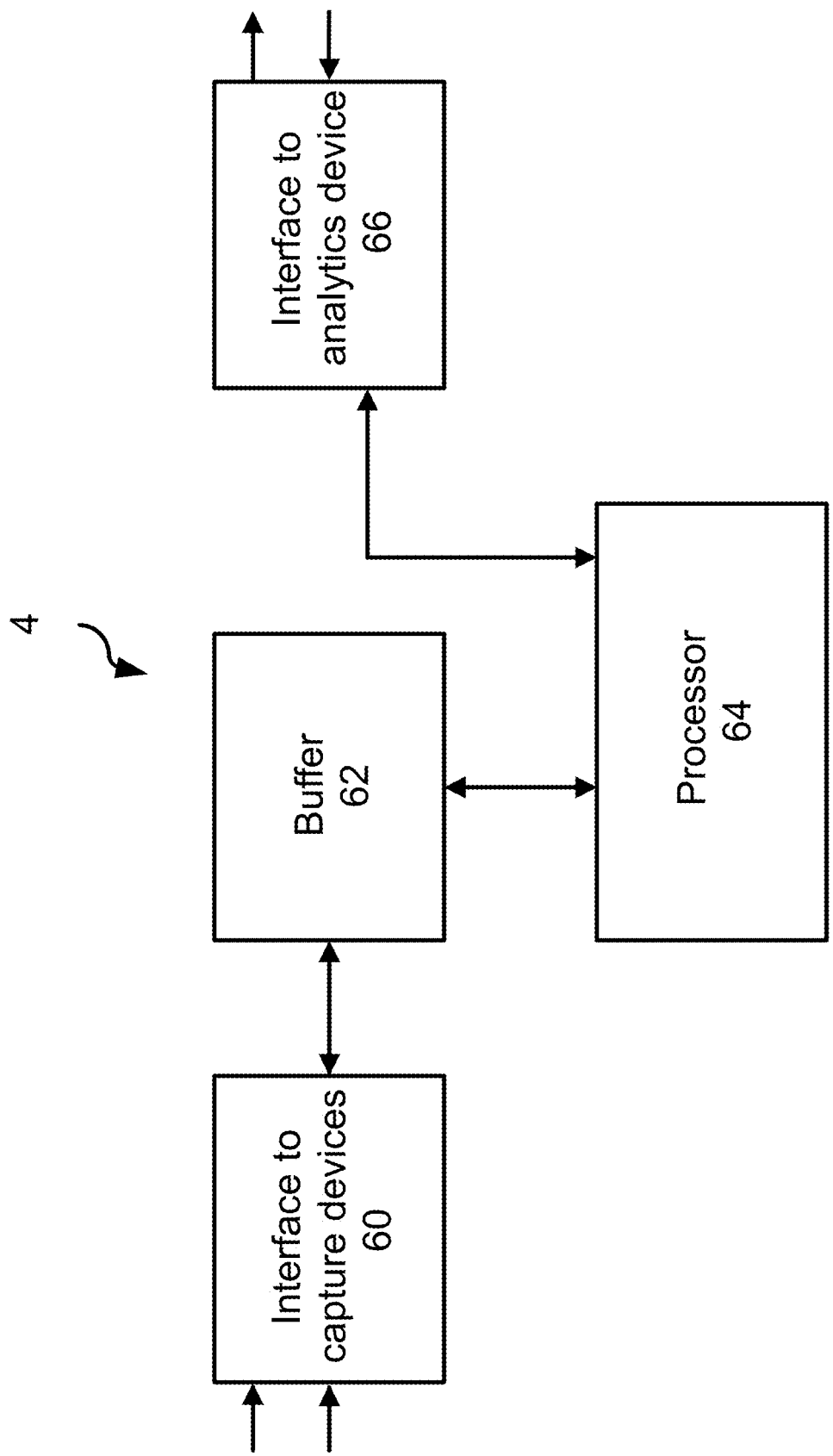
FIG. 4 shows in more detail a packet injecting device of FIG. 1.

Reference is now made to FIG. 4 which schematically shows the packet injecting device 4. The packet injecting device has an interface 60 with one or more capture devices. In some embodiments the interface may provide sockets defining connections with the packet capture devices. Data from the packet capture device is transferred to the packet injecting device using the sockets and appropriate transport protocols such as TCP/IP (Internet Protocol) or the like.

The packet injecting device has a buffer 62 which is configured to store the received data. The packet injecting device also has at least one processor which may operate in conjunction with at least one processor. The at least one processor may be configured to process the data stored in the buffer to put it into the same or similar format in which the data was received at the capture device. This processing may optional include putting the time stamp information into that processed data. The processed data is output via interface 66 to the analytics device 6.

In some embodiments, each analytics device is provided with its own dedicated packet injecting device. In other embodiments, a packet injecting device is associated with two or more analytics devices. In some embodiments a single device may support a plurality of analytics devices and the associated packet injecting device.

In some embodiments a two-tier buffering system is provided for real-time consuming applications, run on the analytics device. The first tier makes the data available in relatively large RAM buffers provided in the packet injecting device while the second tier provides access to the persistent block store associated with the respective capture device in the event that the RAM buffers have been recycled to handle newly captured frames. In other words, if the RAM buffers are unable to keep pace with the real time data, the persisted data can be used so that no data is lost.

Thus, in embodiments, the locally consuming applications, for example the analyzing device does not always have to process data as fast as it is captured but can fall behind at times of relatively high capture rates and catch up from the persisted data store when rates drop. The source of the data (i.e. the real time data or from the block store) which the application on the analytics device is consuming is transparent to that device. All the analytics device perceives is that it is receiving a seamless stream of frames.

Thus, in some embodiments, consuming applications unable to keep up with transitory high traffic capture rates may remotely backpressure the streams with effectively no loss.

In some embodiments, real-time capture streams can be delivered to one or more packet injecting devices from anywhere in the network. Once there, the packet injecting device can be used to optionally filter, pace and replay these streams directly into an analytics appliance or device. This analytics appliance or device may receive in-order gapless streams independently of the network conditions between itself and the capture point at a rate it can handle losslessly.

In some embodiments, the analytics device may provide the ability for real-time remote consumers (analytics device) to consume capture streams as if they were running locally on the packet injecting device.

Some embodiments may allow the analytic device to be fed via network injection from two or more remote capture devices in an efficient and lossless manner over a LAN (local area network) or WAN (wide area network).

In some embodiments, any network bottlenecks relative to the consuming streams between the packet injecting device and the analytics device do not pose a problem.

Figure 5:
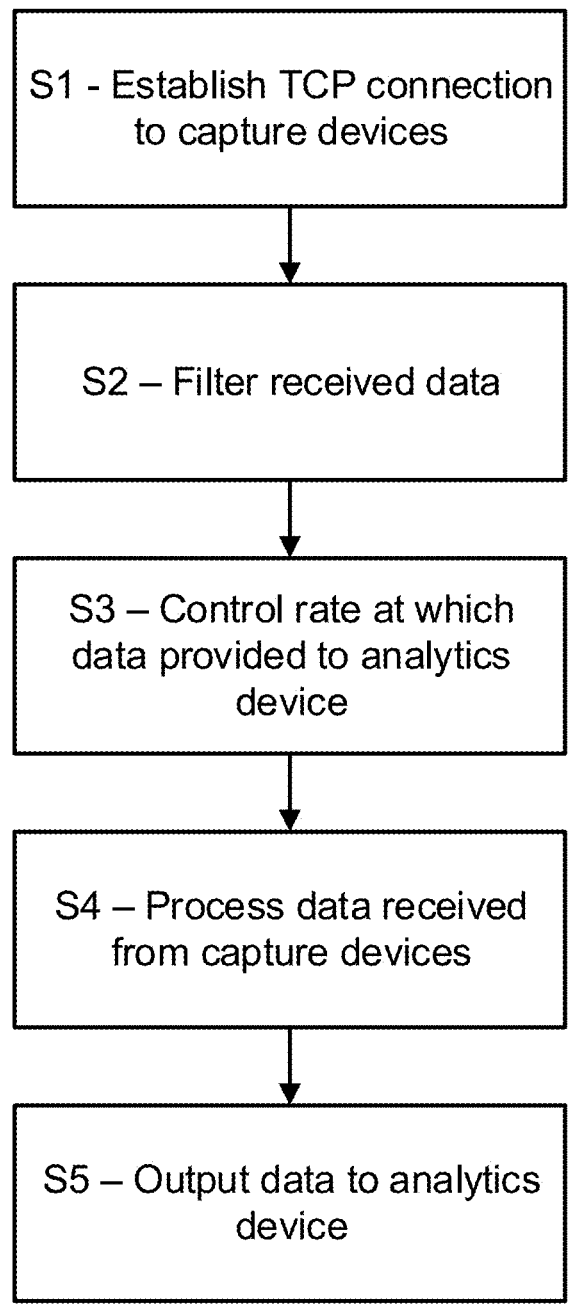
FIG. 5 shows a method performed by the packet injecting device.

Reference is made to FIG. 5 which schematically shows a method carried out by the packet injecting device in some embodiments.

In the first step S1, a TCP connection is established with the respective capture devices. The network may be configured such that the packet injecting device has knowledge as to which one or more data capture devices capture the data in which the analytics device is interested. One or more sockets may be set up for the data to be received from the one or more data capture devices.

In other embodiments, the analyzer device may request specific data. The packet injecting device may send that request to all of the data capture devices. The data capture devices which have or will have the requested data respond and the required TCP connections are established.

The establishing of the TCP connection may involve the exchange of messages.

Data captured by one or more data capture devices is provided to the packet injecting device and is stored in the buffer.

In step S2, which is optional, there may be some filtering of the received data. In some embodiments, any filtering may be carried out in the data capture device or devices so that only the data which is required is sent to the packet injecting device. In some embodiments, the filtering may be done in the packet injecting device where for example the data requirements of the analytics device changes over time.

In step S3, the rate at which data is provided to the analytics device may be controlled. The analytics device may have a maximum rate at which it is able to accept data. The packet injecting device may be configured to ensure that this rate is not exceeded. This may be achieved in any suitable way. For example, there may be messaging between the analytics device and the packet injecting device controlling the rate at which the data is transferred to the analytics device. Alternatively, the rate at which data is provided has a threshold value and the data rate is kept below this threshold.

A consequence of this control, may be that buffer in the packet injecting device fills up. If the TCP protocol is used, the message exchange between the packet injecting device and the one or more data capture devices will ensure that the buffer does not overflow. This means that the rate at which data is sent to the packet injecting device is reduced or even that the sending of data is stopped.

It should be appreciated that when this condition is met, the analytics will no longer receive the so-called real time data but will start to receive the data which has been stored in the block store. The sending of data from the block store will continue until there is a catch up with the real time data at which point, the real time data will be used again. This may be controlled by the controller in the data capture device.

The time stamp information may be used to ensure that there is sequential delivery of the data to the analytics device when there is change from the real time data and the data stored in the block store and vice versa. The time stamp information may be used in the packet capture device to control the order of the output of the packets to the packet injecting device and/or the order in which the data is output to the analyzing device. It should be appreciated that in some embodiments, the analyzing device may be able to process data out of order and/or carry out any reordering which is required for the data. This would make use of the time stamp information.

In step S4, the data which is received from the data capture device is processed so that is the same or similar to the format of the data when it is received by the data capture device. For example, if the data is encapsulated to transmit it from the data capture device to the packet injecting device, then the encapsulation is removed. The data can be processed as it is stored into the buffer and/or the data may be processed as it is read out of the buffer. The data may be modified to include metadata such as the time stamp into the data packet.

In step S5, the data is output to the analyzer device.

Embodiments may be provided by hardware blocks comprising one or more processors configured to run computer executable instructions in conjunction with at least one memory. One or more of the functional blocks shown in FIG. 1 may be regarded as a software module. One or more of the functional blocks may alternatively or additionally be provided by suitable hardware blocks.

At least part of some embodiments may be considered to be a virtual appliance which is provided by suitable hardware.

In some embodiments, at least part of some embodiments may be provided by one or more servers.

In some embodiments, the packet injector device may be omitted. In those embodiments, the functionality of the packet injector device may be provided by the user of the data, that is the analytic device or the like. In this scenario, the analytics device would have sockets or the like configured to receive data from each of the relevant data capture devices. The analytics device would have a buffer and processor. In this scenario the analytics device would be paced by the ability of the buffer to receive data. If the buffer is too full to receive further real time data, the TCP protocol will cause the data capture devices to slow down the rate at which data is transferred and instead the data which is transferred will be from the block store. As with the above described embodiments, when the analytics device has caught up with the real time data, the capture devices will send the real time data instead of the data from the respective block store.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

In some embodiments, computer executable instructions may be downloaded to cause hardware to provide the system of embodiments.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus comprising a data injecting arrangement comprising:
   an input configured to receive data directly from a plurality of data capture devices that is network connected to the input, wherein said data is captured from a network by the plurality of data capture devices in a first format and processed by the plurality of data capture devices to convert it to a different format, and wherein the processing to convert the data to the different format comprises placing the data in accordance with a network communication protocol for communication between the plurality of data capture devices and the input;
   at least one buffer configured to store said data; and
   at least one processor configured to:
      process said received data such that said data is in said first format; and
      provide the received data to an output,
   wherein the data injecting arrangement comprises the output, wherein the output is configured to output said received data in said first format to an application which uses said data, and
   wherein the at least one processor is configured to, in response to the at least one buffer filling up above a threshold, (i) send messages to the plurality of data capture devices in order to reduce a rate at which the data is sent to the data injecting arrangement such that the at least one buffer does not overflow and (ii) configure the input to switch from receiving data directly from the plurality of data capture devices to receiving data indirectly from the plurality of data capture devices via a block store.

2. A data injecting arrangement as claimed in claim 1, wherein the at least one processor is configured to control a rate of output of said data to said application by at least one of:
   controlling the rate such that said rate does not exceed a maximum output rate; and
   controlling the rate in dependence upon messaging from the application.

3. A data injecting arrangement as claimed in claim 1, wherein the input is configured to receive data directly from the plurality of data capture devices.

4. A data injecting arrangement as claimed in claim 1, wherein the at least one processor is configured to:
   receive from the application, a request for data;
   select one or more of the data capture devices in dependence upon the request from the application; and
   cause sending to the selected one or more of the data capture devices, a request for data from the selected one or more of the data capture devices.

5. A data injecting arrangement as claimed in claim 4, wherein the at least one processor is configured to establish connections with the selected one or more of the data capture devices.

6. A data injecting arrangement as claimed in claim 1, wherein the at least one processor is configured to filter the data in accordance with data requirements of the application.

7. A system comprising a first device and a plurality of data capture devices, wherein the first device and the plurality of capture devices are network connected, wherein each of said plurality of data capture devices comprises:
   an input configured to capture data from a network in a first format;
   a processor configured to process said data to have a different format and to include time information, wherein processing said data comprises converting the data to the different format such that it is in accordance with a network communication protocol for communication between the plurality of data capture devices and the first device;
   a writer configured to write said data to a data store; and
   an output configured to output said data in said different format, and said first device comprising:
      an input configured to receive directly from the plurality of data capture devices said data in said different format with time information;
      at least one buffer configured to store data; and
      at least one processor configured to:
         process received data such that said received data is in said first format; and
         an output configured to output said received data in said first format to an application which uses said data,
   wherein the at least one processor is configured to, in response to the at least one buffer filling up above a threshold, (i) send messages to the plurality of data capture devices in order to reduce a rate at which the data is sent to the data injecting arrangement such that the at least one buffer does not overflow and (ii) configure the input to switch from receiving data directly from the plurality of data capture devices to receiving data indirectly from the plurality of data capture devices via a block store.

8. A system as claimed in claim 7, wherein the at least one processor of the first device is configured to provide the received data to the output of the first device in an order dependent upon the time information received with the received data.

9. A system as claimed in claim 7, wherein:
   the first format is an unencapsulated format;
   the different format is an encapsulated format;
   the processing said data to have a different format comprises encapsulating said data to place said data in said encapsulated format; and
   the processing said received data such that said data is in said first format comprises removing encapsulation from said received data such that said data is in said unencapsulated format.

10. A data injecting arrangement comprising:
   an input configured to receive directly from a plurality of data capture devices, data captured by said plurality of data capture devices from a network, wherein said data is, prior to being converted to an encapsulated format by the plurality of data capture devices, captured by the plurality of data capture devices from the network in a unencapsulated format and received from the plurality of data capture devices in the encapsulated format;
   at least one buffer configured to store data;
   at least one processor configured to remove encapsulation from said received data such that said data is in said unencapsulated format; and
   an output configured to output said received data in said unencapsulated format to an application which uses said data,
   wherein the at least one processor is configured to, in response to the at least one buffer filling up above a threshold, (i) send messages to the plurality of data capture devices in order to reduce a rate at which the data is sent to the data injecting arrangement such that the at least one buffer does not overflow and (ii) configure the input to switch from receiving data directly from the plurality of data capture devices to receiving data indirectly from the plurality of data capture devices via a block store.

11. A data injecting arrangement as claimed in claim 10, wherein the encapsulated format is a transmission control protocol format.

12. A data injecting arrangement as claimed in claim 10, wherein the at least one processor may be configured to control a rate of output of said data to said application by at least one of:
   controlling the rate such that said rate does not exceed a maximum output rate; and
   controlling the rate in dependence upon messaging from the application.

13. A data injecting arrangement as claimed in claim 10, wherein the input is configured to receive data directly from the plurality of data capture devices that is network connected to the input in real time.

14. A data injecting arrangement as claimed in claim 10, wherein the at least one processor is configured to:
   receive from the application, a request for data;
   select one or more of the data capture devices in dependence upon the request from the application; and
   cause sending of a request for data from the selected one or more of the data capture devices.

15. A system as claimed in claim 10, wherein the received data is in a packet capture format.

* * * * *